Jan. 21, 1936.　　　　E. H. KREMER　　　　2,028,398
BELT CONNECTER
Filed Feb. 13, 1934　　　2 Sheets-Sheet 1
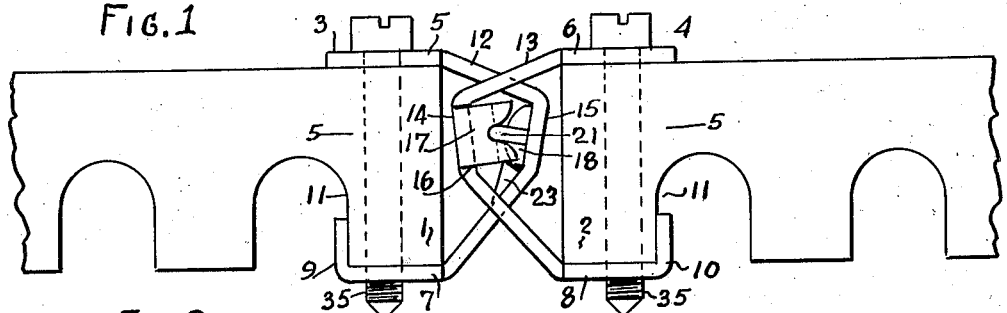
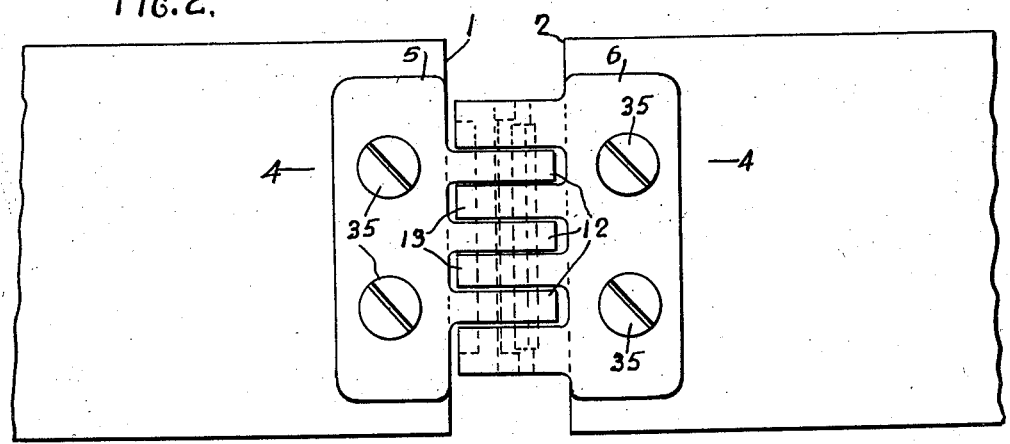
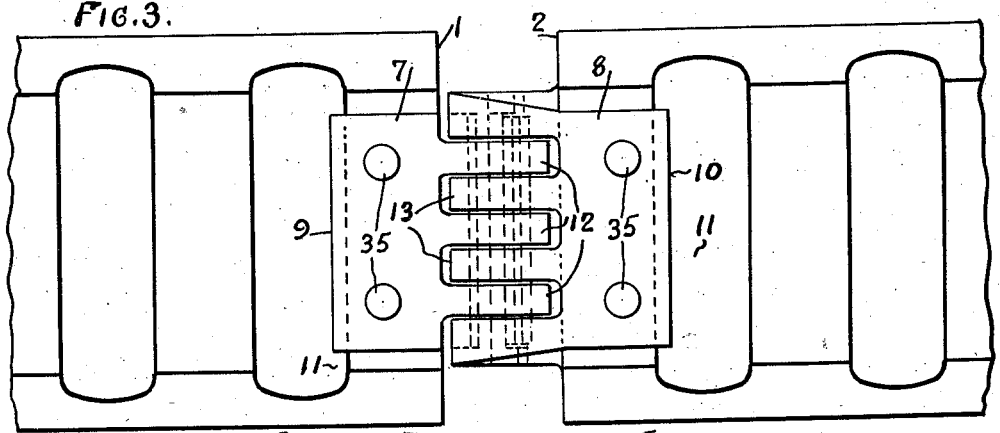
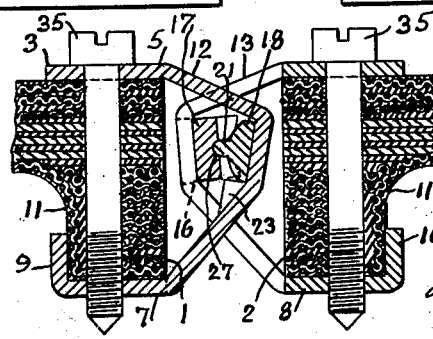
Inventor
EDWARD H. KREMER,
BY
Attorneys Jan. 21, 1936.  E. H. KREMER  2,028,398
BELT CONNECTER
Filed Feb. 13, 1934  2 Sheets-Sheet 2
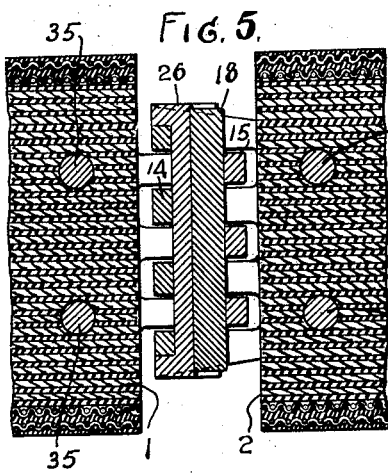
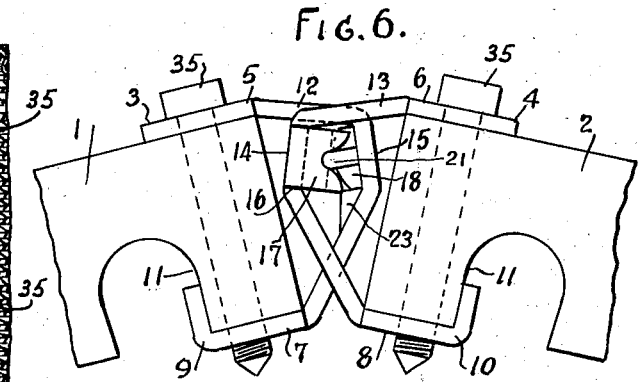
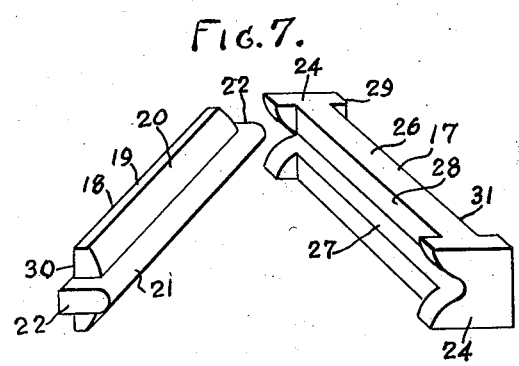
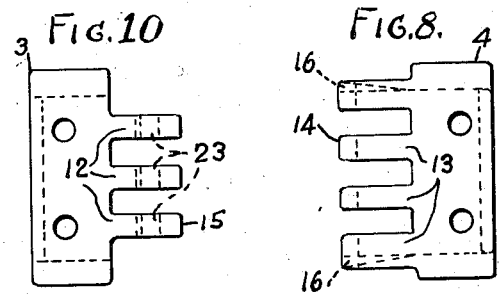
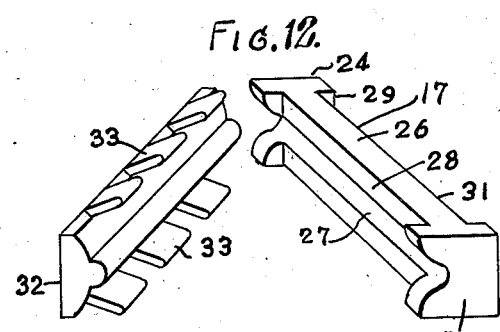
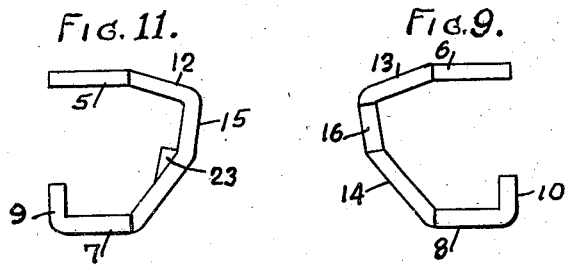
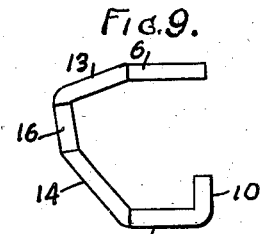
Inventor
EDWARD H. KREMER,
BY
Attorneys Patented Jan. 21, 1936

2,028,398

UNITED STATES PATENT OFFICE 2,028,398

BELT CONNECTER

Edward H. Kremer, Dayton, Ohio, assignor to The Dayton Rubber Mfg. Company, Dayton, Ohio, a corporation of Ohio Application February 13, 1934, Serial No. 711,035

11 Claims. (Cl. 24—33)

This invention relates to belt connecters and, in particular, to belt connecters having interengaging clamping members with pintle members held between them to provide bearing action and load support.

The problem which the applicant faced in connection with this invention was to devise a belt connecter of the above type which would prevent the pintle pins from becoming disengaged relative to one another as well as to prevent either one of them from sliding down within the clamping members and thereby cause cutting or wear of the latter.

One object of my invention is to provide a belt connecter having interlacing clamping members with pintle members engaged thereby, one clamping member and one pintle member having engaging projections and depressions to keep the pintle member in its operative position and prevent it from sliding down.

Another object is to provide such a belt connecter wherein one of the pintle members is held in position by one of the clamping members by inter-engaging projections and depressions thereon; and wherein the other pintle member is likewise held in position by a projection on the clamping member.

Another object is to provide such an arrangement of clamping members and pintle members wherein the latter have cooperating bearing projections and depressions of unequal depths, whereby to carry the load therein and separate the opposing faces of the pintle members.

Another object is to provide such a belt connecter having clamping members, one of which is arranged to hold one of the pintle members in position, the pintle members having means to prevent their disengagement from one another either longitudinally or transversely.

In the drawings:

Figure 1 is a side elevation of the belt connecter of my invention, shown joining the ends of a belt;

Figure 2 is a top plan view of the belt connecter of my invention;

Figure 3 is a bottom plan view of the belt connecter shown in Figures 1 and 2;

Figure 4 is a vertical section along the line 4—4 of Figure 2;

Figure 5 is a horizontal section along the line 5—5 of Figure 1;

Figure 6 is a side elevation similar to Figure 1, but with the opposite ends and clamping members of the belt connecter angled, as in passing over a small pulley;

Figure 7 is a perspective view of the two pintle members in separated position to show their construction;

Figure 8 is a top plan view of a clamping member having slotted portions;

Figure 9 is a side elevation of the clamping member shown in Figure 8;

Figure 10 is a top plan view of a clamping member having lugs thereon;

Figure 11 is a side elevation of the clamping member shown in Figure 10;

Figure 12 is a perspective view of a modified form of a male pintle pin having wings along its edges to prevent its disengagement from the opposite pintle pin.

Referring to the drawings in detail, the belt connecter of my invention is shown in Figure 1 as connecting the ends of a belt composed of layers of fabric and rubber. The belt connecter proper is provided with opposing clamping members 3 and 4, roughly shaped like a letter C and having their upper arms 5 and 6 approximately parallel to their lower arms 7 and 8, the latter being angled at 9 and 10 to grip the cut-away portions 11 with which the belt is preferably supplied. These cut-away portions 11 cause the inner surface of the belt to become shortened in length relative to the outer surface when the belt is passing around pulleys, especially those of small diameters. On the forward parts of the clamping members 3 and 4 are tongues 12 and 13 respectively. These tongues are fitted together so that they interlace with one another when the belt connecter is in use. The tongues 12 and 13 have flattened nose portions 14 and 15 to engage the flattened backs of the pintle members. The outer tongues 13 of one clamping member are provided with slots or depressions 16 adapted to receive the flanges on the heads of one of the pintle members hereinafter described, whereas the tongues 12 have lugs or projections 23 secured thereto, as by welding or brazing, or formed thereon by upsetting a portion of the clamping member. These lugs 23 prevent the other pintle member from sliding down. Thus the slots 16 receive one pintle member while lugs 23 engage the other so that the two are effectively held in position. The slots 16 may, of course, give a loose fit to the pintle member received therein, or the pintle member may be tightly fitted in the slots or welded, or otherwise fastened therein to the tongues.

When the clamping members 3 and 4 are in position with their tongues 12 and 13 interconnecting with one another, they are then provided with pintle members 17 and 18 respectively; these being adapted to provide a bearing engagement between the opposite clamping members 3 and 4. The male pintle member 18 is of elongated construction, having a body portion 19 with an arcuate face 20 and a rib 21 thereon. The latter is extended beyond each end of the body portion 19 to provide projecting shoulders 22.

The female pintle member has an elongated body portion 26 with flanged heads 24 on each end thereof, these being of such dimensions as to fit into the slots 16 in the clamping member 13. The body portion 26 is of substantially the same length as the body portion 19 of the male pintle member 18, thereby holding the latter between the flanges and preventing the longitudinal displacement. The female pintle member is provided with a groove 27 running continuously through the flanges 24 and the body portion 26, and is shallower than the rib 21 on the opposite pintle member which it engages. The surfaces 28 and 20 of the two pintle members will thus face one another, yet be spaced apart by the cooperation of the rib 21 and the shallower groove 27. The pintle flanges 24 are cut away on either side of the groove 27, where it passes through them so as to permit the projecting shoulders 22 of the male pintle member to rock freely therein, it being held from transverse displacement by the wing-like corners 29 of the flanged heads 24 formed by this cutting away of the latter.

The male pintle member 18 has a flattened back surface 30 which is seated against the inside flat surface of the flattened nose portion 15 of the tongues 12, whereas the flattened surface 31 of the female pintle member is similarly seated against the flat inner surface of the flattened nose portion 14 of the tongues 13.

In place of the pintle members having the extending shoulders and flanged head grooves to prevent transverse displacement, it will be obvious that other pintle pin constructions could be used without departing from the scope of my invention. For example, one of the pintle pins 32 (Figure 12) may be provided with wings 33 along its edges. These wings extend over the edges of the opposite pintle member and prevent the transverse disengagement of one from the other. The lugs 23 and/or the slots 16 may still be provided, however, to prevent the "sliding-down" of either or both of the pintle members.

The belt to which the belt connecter of my invention is connected may be of any suitable type, but the rubber-and-fabric type of belt is especially adaptable to its use. Such a belt is composed of alternate layers of rubberized fabric, which are fitted together, as by winding them on a drum and then cutting the individual belt sections therefrom in a manner well known to the art. The various sections are then placed in moulds and vulcanized. Additional cords may be provided, if desired, to cause the belt to be substantially inextensible along its neutral axis.

In assembling the belt connecter of my invention, the tongues 12 and 13 are interlaced and the pintle members 17 and 18 placed in engagement between them, with the rib 21 rocking in the groove 27 and the body portion 19 enclosed between the flanged heads 24. The rearward ends of the flanged heads 24 are inserted in the slots 16 of the tongues 13, and the body portion 19 of the opposite pintle member placed above the lugs 23. The belt ends 1 and 2 are then inserted between the upper and lower arms 5 and 7 or 6 and 8 of the clamping members 3 and 4 and secured thereto by the clamping screws 35 passing through the maximum thickness portion of the belt ends.

In the operation of the belt, when the belt ends 1 and 2 pass around a small pulley, the clamps 3 and 4 will tilt relative to one another, causing the two pintle members to rock on the ridge 21 of one and the groove 27 of the other. The end shoulders 22 will engage the projections 29 of the flanged heads 24 and prevent transverse disengagement of the pintle members. The flanged heads 24, on the other hand, by holding the body portion of the opposite pintle member, effectively prevent longitudinal dislodgement thereof. The slots 16, moreover, as well as the lugs 23 will prevent "sliding-down" of either of the pintle members, as frequently occurs in ordinary belt connecters. Thus wear or breakage will be effectively reduced by the use of the belt connecter of my invention.

It will be understood that the slots 16 in one clamping member could be omitted without departing from the scope of my invention, since the lugs 23 would still provide some protection against the sliding-down of the pintle members. It will be further understood that the omission of the end shoulders 22 would also not remove the device from the scope of my invention, since the slots 16 and/or the lugs 23 would yet give a substantial amount of protection against transverse dislodgement.

It will be understood that I desire to comprehend within my invention such modifications as may be necessary to adapt it to varying conditions and uses.

Having thus fully described my invention, what I claim as new and desire to secure by Letters Patent is:

1. A belt connecter comprising clamping members having interlaced tongues with relatively-rocking paired pintle members therebetween, the tongues of one of said clamping members having inwardly projecting lugs on the inner surfaces thereof engaging the pintle member associated therewith, whereby to prevent the sliding-down of one pintle member relative to the other.

2. A belt connecter comprising clamping members having interlaced tongues with relatively-rocking paired pintle members therebetween, the tongues of one of said clamping members having inwardly projecting lugs on the inner surfaces thereof engaging one edge of the pintle member associated therewith, whereby to prevent the sliding-down of one pintle member relative to the other.

3. A belt connecter comprising clamping members having interlaced tongues with relatively-rocking paired pintle members therebetween, the tongues of one of said clamping members having inwardly projecting lugs on the inner surfaces thereof engaging the pintle member associated therewith, whereby to prevent the sliding-down of one pintle member relative to the other, the other clamping member and the other pintle member having inter-engaging depressions and projections respectively.

4. A belt connecter comprising clamping members having interlaced tongues with relatively-rocking paired pintle members therebetween, the tongues of one of said clamping members having inwardly projecting lugs on the inner surfaces thereof engaging one edge of the pintle member associated therewith, one of said pintle members having end projections, the opposite clamping member having cut-away portions to receive the projections to hold the pintle member associated therewith.

5. A belt connecter comprising clamping members having interlaced tongues with pintle members therebetween, one of said tongues on one of said clamping members having a lug thereon adapted to engage the lower edge of one of said pintle members, the other pintle member having end projections, the tongues on the opposite clamping member having cut-away portions to receive the end projections to hold the pintle member associated therewith, whereby to prevent the sliding-down of said pintle members.

6. A belt connecter comprising clamping members having interlaced tongues with pintle members therebetween, one of said pintle members having enlarged ends, one of said clamping members having slotted tongues adapted to receive said enlarged ends, the opposite clamping member having means for preventing the sliding-down of its pintle member.

7. A belt connecter comprising interlaced clamping members with pintle members therebetween, one of said pintle members having a rib with projecting end shoulders, the other of said pintle members having a groove to receive the rib and grooved flanged ends to receive the shoulders, one of said clamping members having grooves adapted to engage said flanged ends, the other of said clamping members having projections adapted to support the opposite pintle member.

8. A belt connecter comprising clamping members with interlaced tongues and relatively-rocking paired pintle members therebetween, each of said tongues having a flattened nose portion adapted to engage each of said pintle members, each said pintle member having a flat back surface, and a tongue on one of said clamping members having an inwardly projecting lug on the inner surface thereof adapted to support one of said pintle members.

9. A belt connecter comprising clamping members with interlaced tongues and relatively-rocking paired pintle members therebetween, a tongue on one of said clamping members having an inwardly projecting lug on the inner surface thereof adapted to support one of said pintle members, one of said pintle members being provided with spaced wings along each edge thereof adapted to prevent the transverse dislodgment of said pintle members from one another.

10. A belt connecter comprising interlaced clamping members with pintle members therebetween, one of said clamping members having upwardly-extending lugs adapted to support one of said pintle members, one of said pintle members being provided with wings along the edges thereof adapted to prevent the transverse dislodgment of said pintle members from one another, the other pintle member having end flanges thereon, said edge projections and said end flanges being adapted to prevent the transverse and longitudinal dislodgment of said pintle members from one another.

11. A belt connecter comprising clamping members with interlaced tongues and relatively-rocking paired pintle members therebetween, one of said pintle members having a relatively deep rib, the other of said pintle members having a relatively shallow groove engaged by said rib, a tongue of one of said clamping members having an inwardly projecting lug on the inner surface thereof engaging one of said pintle members to prevent the sliding-down thereof, each of said pintle members having opposing faces spaced apart from one another by the engagement of said rib in said relatively shallow groove.

EDWARD H. KREMER.